United States Patent
Lu et al.

(10) Patent No.: US 10,334,542 B2
(45) Date of Patent: Jun. 25, 2019

(54) WIRELESS DEVICE, A FIRST ACCESS NODE AND METHODS THEREIN

(71) Applicant: Telefonaktiebolaget LM Ericsson (publ), Stockholm (SE)

(72) Inventors: Qianxi Lu, Beijing (CN); Erik Eriksson, Linköping (SE); Qingyu Miao, Beijing (CN); Jianfeng Wang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 167 days.

(21) Appl. No.: 15/027,092

(22) PCT Filed: Feb. 3, 2016

(86) PCT No.: PCT/CN2016/073250
§ 371 (c)(1),
(2) Date: Apr. 4, 2016

(87) PCT Pub. No.: WO2017/132849
PCT Pub. Date: Aug. 10, 2017

(65) Prior Publication Data
US 2018/0063801 A1  Mar. 1, 2018

(51) Int. Cl.
*H04W 56/00* (2009.01)
*H04W 52/50* (2009.01)
(Continued)

(52) U.S. Cl.
CPC ......... *H04W 56/001* (2013.01); *H04W 52/50* (2013.01); *H04W 72/0446* (2013.01);
(Continued)

(58) Field of Classification Search
None
See application file for complete search history.

(56) References Cited

U.S. PATENT DOCUMENTS

2006/0215617 A1  9/2006  Martin
2014/0112254 A1*  4/2014  Lindoff ............... H04W 74/002
                                                    370/328
(Continued)

FOREIGN PATENT DOCUMENTS

CN        1839569 A     9/2006
CN      102026231 A     4/2011
(Continued)

OTHER PUBLICATIONS

International Search Report and Written Opinion of the International Searching Authority, International Application No. PCT/CN2016/073250, dated Oct. 27, 2016.
(Continued)

*Primary Examiner* — Faruk Hamza
*Assistant Examiner* — Cassandra L Decker
(74) *Attorney, Agent, or Firm* — Sage Patent Group

(57) ABSTRACT

A wireless device and a method therein for enabling a single Random Access (RA) preamble to be received by a first Access Node (AN) and by a second AN, which first and second ANs are asynchronous ANs. The wireless device, and the first and second ANs are operating in a wireless communications network. The wireless device receives a first signal from the first AN and a second signal from the second AN. Based on the received first and second signals, the wireless device determines an overlapping time window during which a transmission from the wireless device is receivable by the first and second ANs, and transmits a single RA preamble to the first and second ANs during the determined overlapping time window.

17 Claims, 10 Drawing Sheets

Method performed by a wireless device 206

(51) Int. Cl.
*H04W 72/04* (2009.01)
*H04W 74/08* (2009.01)
*H04W 52/10* (2009.01)
*H04W 52/24* (2009.01)

(52) U.S. Cl.
CPC ........ *H04W 74/0833* (2013.01); *H04W 52/10* (2013.01); *H04W 52/245* (2013.01)

(56) References Cited

U.S. PATENT DOCUMENTS

| | | | | |
|---|---|---|---|---|
| 2016/0119099 | A1* | 4/2016 | Kim | H04L 5/0048 370/329 |
| 2017/0048812 | A1* | 2/2017 | Da | H04W 56/004 |
| 2017/0359734 | A1* | 12/2017 | Lee | H04W 74/0833 |

FOREIGN PATENT DOCUMENTS

| | | | |
|---|---|---|---|
| WO | WO 2012/173565 A1 | 12/2012 | |
| WO | WO-2013025152 A1 * | 2/2013 | ............ H04W 24/10 |
| WO | WO 2015/013073 A1 | 1/2015 | |

OTHER PUBLICATIONS

European Search Report Communication and Supplementary European Search Report, EP 16 88 8674, dated Dec. 4, 2018, 4 pages.
Remaining Aspects of RA Preamble Transmission, Samsung, 3GPP TSG RAN WG1 #83, Anaheim, USA, Nov. 16-20, 2015, R1-156736, 2 Pages.
Considerations on PRACH Design for NB-IoT, ETRI, 3GPP TSG RAN WG1 NB-IoT Ad-hoc Meeting, Budapest, Hungary, Jan. 18-21, 2016, R1-160124, 3 Pages.

* cited by examiner

Figure 3 Method performed by a wireless device 206

Figure 5 Method performed by 1st AN 208

US 10,334,542 B2

WIRELESS DEVICE, A FIRST ACCESS NODE AND METHODS THEREIN

CROSS REFERENCE TO RELATED APPLICATION

This application is a 35 U.S.C. § 371 national stage application of PCT International Application No. PCT/CN2016/073250, filed on Feb. 3, 2016, the disclosure and content of which is incorporated by reference herein in its entirety.

TECHNICAL FIELD

Embodiments herein relate to a wireless device, a first Access Node (AN) and to methods therein. Especially, embodiments herein relate to enabling a single Random Access (RA) preamble to be received by the first AN and a second AN.

BACKGROUND

Communication devices such as terminals or wireless devices are also known as e.g. User Equipments (UE), mobile terminals, wireless terminals and/or mobile stations. Such terminals are enabled to communicate wirelessly in a wireless communication system or a cellular communications network, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network.

The above terminals or wireless devices may further be referred to as mobile telephones, cellular telephones, laptops, or tablets with wireless capability, just to mention some further examples. The terminals or wireless devices in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. "eNB", "eNodeB", "NodeB", "B node", or Base Transceiver Station (BTS), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated at the base station site, may serve one or several cells. Further, each base station may support one or several communication technologies. The base stations communicate over the air interface operating on radio frequencies with the terminals or wireless devices within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

With an increasing demand from the network society, either on huge traffic volume or on very low latency, communications network need to be continuously evolved to meet such demands. Some consensus have been reached about how to meet the demand, and two methods are considered to be very important. The first method is to densify the communications network, and the second method is to use more frequency spectrum. Due to an insufficient frequency spectrum, the available frequency for next generation communications network would probably be at very high frequencies, e.g. from 10 GHz and above.

However, for such high frequency spectrums, the atmospheric penetration and diffraction attenuation is much worse than for low frequency spectrums. More importantly, the receiver antenna aperture, as a metric describing the effective receiver antenna area that collects the electromagnetic energy from an incoming electromagnetic wave, is frequency dependent, i.e., the link budget would be worse for the same link distance even in free space scenario, if omni-directional receive and transmit antennas are used. This motivates the usage of beam-forming in order to compensate for the loss of link budget in high frequency spectrums. Beam-forming may be used at the transmitter, at the receiver, or both. In a large part of the spectrum planned for 5G deployments, the preferred configuration is to use a large antenna array at the Access Node (AN) and a small number of antennas at the wireless device. In the DL, this means that high-order transmit beamforming may be applied by the AN transmitter in the DL.

In current LTE systems, a wireless device sends a Physical Random Access Channel (PRACH) preamble sequence to one or more Radio Network Nodes (RNN), e.g. eNodeBs, based on broadcasted system information and on random access configuration. The timing of each PRACH transmission from the wireless device is based on one or more received downlink Primary Synchronization Signals (PSS) and/or Secondary Synchronization Signals (SSS) from one or more RNNs. In the PRACH preamble the Guard Time (GT) field is designed to cover propagation delay, so that the preamble may be detected by the RNN, assuming a zero timing advance in the uplink subframe. FIG. 1A schematically illustrates time slots for a PRACH preamble for a first wireless device close to the eNodeB and for a second wireless device at the cell edge, respectively. As illustrated, the PRACH preamble comprises a Cyclic Prefix (CP) and a sequence, sometimes herein referred to as a PRACH preamble sequence. Both the first and the second wireless devices align the start of the PRACH preamble with the start of the corresponding uplink subframe at the wireless device assuming a Timing Advance (TA) of zero. The two preambles are received at the eNodeB with different timings depending on the propagation delay in the uplink. The GT is designed to the cover the max Round Trip Delay (RTD) so that the preamble from the second wireless device, i.e. the cell edge UE, is also received in the PRACH time slot.

FIG. 1B schematically illustrates the PRACH timing according to prior art LTE systems. As illustrated in FIG. 1B, and since it is not synchronized among different ANs, the wireless device needs to send three preambles to the three ANs at different points in time if the wireless device requires the three ANs to receive the preamble. In other words, the wireless device needs to send a first preamble at a first point in time if the preamble should be received by the first AN AN A, a second preamble to the second AN AN B at a second point in time if it should be received by the second AN AN B, and a third preamble to the third AN AN C at a third point in time if it should be received by the third AN AN C. The points in time depends on the downlink sync signals from the different ANs. In FIG. 1B, the first preamble for the first AN AN A is sent at the first point of time t_AN_A, the second preamble for the second AN AN B is sent in at the second point of time t_AN_B, and the third preamble for the third AN AN C is sent in at the third point of time t_AN_C. As illustrated in FIG. 1B, the time difference between the second point in time and the first point in time is given by Δt_AN_B, and the time difference between the third point in time and the first point in time is given by Δt_AN_C.

A drawback with the prior art is that the time to send the PRACH preamble sequence to the eNodeB is based on the broadcasted system information and random access configuration from one eNodeB, e.g. a single eNodeB. This is especially a drawback when it is difficult for several eNodeBs to simultaneously receive the PRACH and when the several eNodeBs are not perfectly synchronous with each other.

SUMMARY

Therefore, an object of embodiments herein is to address at least some of the above-mentioned drawbacks among others and to improve the performance in a wireless communications network.

According to an aspect of embodiments herein, a method is performed by a wireless device for enabling a single Random Access (RA) preamble to be received by a first Access Node (AN) and by a second AN. The first and second ANs are asynchronous ANs. Further, the wireless device, and the first and second ANs are operating in a wireless communications network.

The wireless device receives a first signal from the first AN and a second signal from the second AN.

Based on the received first and second signals, the wireless device determines an overlapping time window during which a transmission from the wireless device is receivable by the first and second ANs.

The wireless device transmits a single RA preamble to the first and second ANs during the determined overlapping time window.

According to another aspect of embodiments herein, a wireless device for enabling a single Random Access (RA) preamble to be received by a first Access Node (AN) and by a second AN is provided. The first and second ANs are asynchronous ANs. Further, the wireless device, and the first and second ANs are operable in a wireless communications network.

The wireless device is configured to receive a first signal from the first AN and a second signal from the second AN.

Further, the wireless device is configured to determine, based on the received first and second signals, an overlapping time window during which a transmission from the wireless device is receivable by the first and second ANs.

Furthermore, the wireless device is configured to transmit a single RA preamble to the first and second ANs during the determined overlapping time window.

According to another aspect of embodiments herein, a method is performed by a first Access Node (AN) for enabling a single Random Access (RA) preamble from a wireless device to be received by the first AN and by a second AN. The first and second ANs are asynchronous ANs. Further, the wireless device and the first and second ANs are operating in a wireless communications network.

The first AN transmits a first signal to the wireless device.

Further, the first AN receives a single RA preamble from the wireless device during an overlapping time window during which a transmission from the wireless device is receivable by the first and second ANs.

According to another aspect of embodiments herein, a first Access Node (AN) for enabling a single Random Access (RA) preamble transmitted from a wireless device to be received by the first AN and by a second AN is provided. The first and second ANs are asynchronous ANs. Further, the wireless device, and the first and second ANs are operable in a wireless communications network.

The first AN is configured to transmit a first signal to the wireless device.

Further, the first AN is configured to receive a RA single preamble from the wireless device during an overlapping time window during which a transmission from the wireless device is receivable by the first and second ANs.

According to another aspect of embodiments herein, a computer program comprising instructions which, when executed on at least one processor, causes the at least one processor to carry out the method performed by the wireless device is provided.

According to another aspect of embodiments herein, a computer program comprising instructions which, when executed on at least one processor, causes the at least one processor to carry out the method performed by the first AN is provided.

Since the wireless device receives a first signal from the first AN and a second signal from the second AN, which first and second ANs are asynchronous ANs, since the wireless device determines, based on the received first and second signals, an overlapping time window during which a transmission from the wireless device is receivable by the first and second ANs, and since the wireless device transmits a single RA preamble to the first and second ANs during the determined overlapping time window, the transmitted single RA preamble is receivable at both the first and second asynchronous ANs. Thus, since the wireless device is able to transmit the single RA preamble such that it is receivable by a plurality of asynchronous ANs, the robustness of the RA procedure is increased. This results in an improved performance in the wireless communications network.

An advantage with embodiments herein is that it is possible for the wireless device to determine correct timing offsets for multiple ANs, e.g. the first and the second ANs, with the transmission of a single RA preamble. Once the correct timing offsets have been determined, the wireless device may apply them to transmissions over communication links to different ANs without good synchronization, e.g. to different ANs being asynchronous ANs. By the expressions "ANs without good synchronization" and "asynchronous ANs" when used in this disclosure is meant that an error in synchronization, e.g. a synchronization error, between the ANs, e.g. the first and second ANs, is larger than a length of a Cyclic Prefix (CP), i.e. larger than the CP length.

Another advantage is that the wireless device is able send the RA preambles to several ANs without making a decision to be served by only one of them. Such a decision, e.g. a decision deciding the serving AN, may be taken by the communications network at a later point in time. This is important for a node agonic operation.

BRIEF DESCRIPTION OF DRAWINGS

Examples of embodiments herein will be described in more detail with reference to attached drawings in which.

DETAILED DESCRIPTION

Figure 1A:
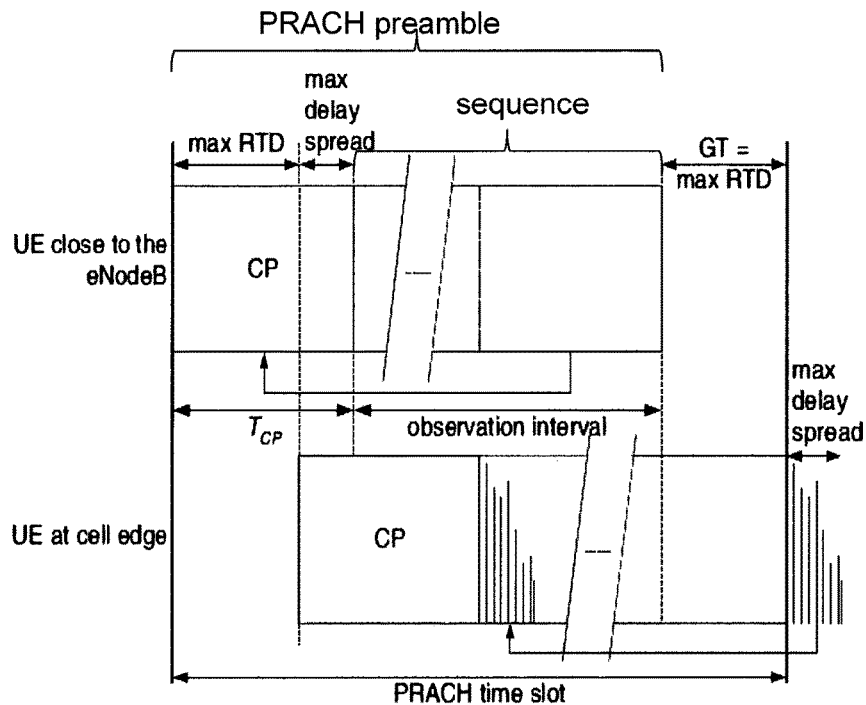
FIG. 1A schematically illustrates prior art time slots for a PRACH preamble for a first wireless device close to the eNodeB and a second wireless device at the cell edge, respectively.
Figure 1B:
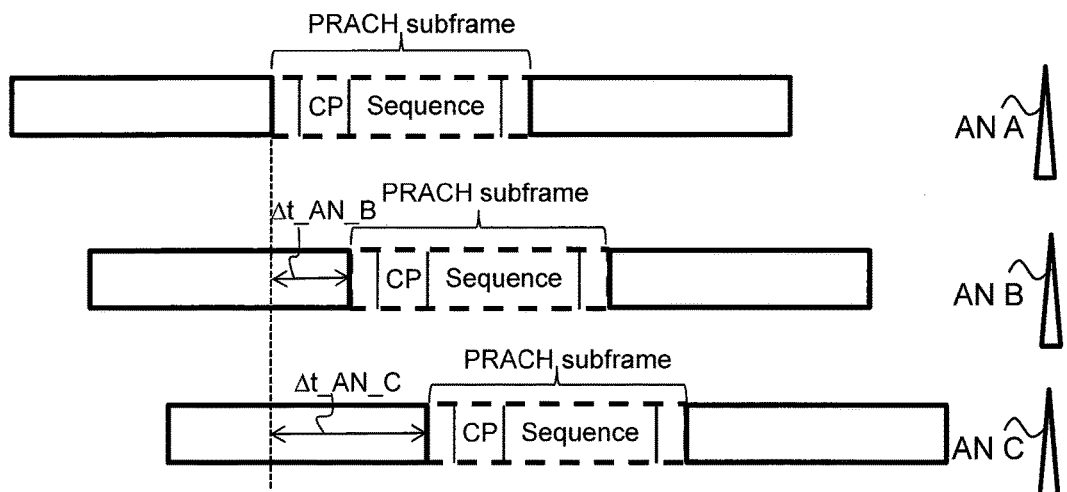
FIG. 1B schematically illustrates the PRACH timing according to prior art LTE systems.

As part of developing embodiments herein, some problems with the state of the art wireless communications systems will first be identified and discussed.

A problem to be solved by embodiments disclosed herein is how a single Random Access (RA) preamble may be received, e.g., detected and/or processed, by multiple Access Nodes (AN's) which are not perfectly synchronous with each other, i.e. they are not perfectly synchronized with each other. This may also be expressed as how to enable two or more ANs, e.g. a first AN and a second AN, which first and second ANs are not perfectly synchronous with each other, to receive a single RA preamble transmitted from a wireless device. In this disclosure, the first and second ANs are sometimes referred to as being asynchronous with each other.

By the expressions "not perfectly synchronous ANs" and "asynchronous ANs" when used in this disclosure is meant that an error in synchronization, e.g. a synchronization error, between the ANs, e.g. the first and second ANs, is larger than a length of a Cyclic Prefix (CP), i.e. larger than the CP length. A synchronization error may be caused by several factors.

Firstly, the NeXt Generation (NX) PHY terminology tends to reduce the CP, to a level of less than 1 microseconds, e.g. to 0.1 microseconds, which is motivated by a shorter delay spread in high frequency spectrum, and also concerns the CP overhead compared to OFDM symbol length. Since the CP length is large, the ratio between CP and data will high, and the time used for data transmission will then be small.

Specifically, this proposal mainly target at the NX numerology of 540 kHz and 2160 kHz cases, for which the CP length is hard to further increase considering the OFDM symbol length of 1.85 and/or 0.46 microseconds.

On the other hand, according to Synchronization for RAN, Alternatives and recommendations 3GPP, the current network sync accuracy scheme targets at a +/−1.5 microseconds budget requirement, which budget includes errors from the Global Positioning System (GPS) signal, the transport network and the RBS. The extreme solution to use Global Navigation Satellite System (GNSS) directly at RBS is neither feasible for an indoor scenario nor an outdoor scenario when one or more high buildings surrounds it. Even in outdoor scenario, it can be challenging or even impossible to work with GNSS equipment in cities where high buildings create urban canyons, where the high buildings and skyscrapers can easily block or reflect the GNSS signal.

So considering the gap between these two factors, possible scenarios wherein an inter-AN sync error cannot be ignored are foreseen, which is yet still within a certain accuracy budget. This is a scenario addressed by some embodiments disclosed herein.

This scenario is motivated by two use cases:

Firstly, in the concept of System Control Plane, the system control plane is separated from the data plane and the initial random access is always done in a node-agnostic way, such that a single RA transmission would be sent to and/or received by multiple ANs, one or several of which would be selected according to some inter-AN coordination to serve the wireless device, and reply the corresponding Random Access Responses (RAR's). Currently, synchronization between ANs are assumed to implement this, so that different ANs send out the same DL reference signal at the same time. Yet how to enable this in an asynchronous scenario? in that case, one key enabler is how for one single RA transmission to be received and/or used by multiple ANs, if different UL timing is to be used by the wireless device to send out the RA transmission.

Secondly, in the concept of NX mobility management, one key area is the UL based mobility, where the UL signal is to be relied by the communications network to identify an AN to serve the wireless device in the UL and/or DL. In this procedure, one key enabler is how to do perform random access to multiple AN's, which the wireless device needs to do before a handover operation in order to acquire information such as UL timing difference information and even acquire channel quality information. Considering the scenario where the ANs are not synchronized with each other, in such scenario it would be more resource efficient and/or energy efficient to use a single RA transmission for multiple ANs to complete this action. If there are a large number of neighboring AN's, the traditional RA scheme in the prior-art handover procedure would cause long interruption to the active connection in the serving AN cell.

A problem addressed by embodiments herein is therefore how to provide a single RA preamble to be receivable by several ANs, and especially receivable by several asynchronous ANs.

In some embodiments herein, the RA preamble transmission scheme is addressed by assuming that there is no transmitted beamforming at the side of the wireless device. If there is transmitted beamforming at the wireless device side, the repeated RA preamble may be transmitted from different transmission (TX) beams. However, it may be assumed that the signal is received by several eNodeBs, and then it may be better that the wireless device transmits the signal with omni direction.

According to some embodiments herein, a Guard Time (GT) field in a single RA occasion subframe is set long enough in order to cover not only propagation delay but also the timing difference between several ANs, e.g. between neighboring ANs, so that the wireless device is able to send the single RA preamble with a flexible timing offset but within a limit value, e.g. a predefined limit value, in order for the ANs to receive the single RA preamble.

Terminology

The following terminology is used in embodiments described herein and is elaborated below:

Access Node (AN): In some embodiments non-limiting term Access Node (AN) is used and it may correspond to any type of radio network node or any network node, which communicates with a wireless device and/or with another network node. Examples of ANs are NodeB, MeNB, SeNB, a network node belonging to a Master Cell Group (MCG) or a Secondary Cell Group (SCG), Base Station (BS), Multi-Standard Radio (MSR) radio node such as MSR BS, eNodeB, relay, donor node controlling relay, Base Transceiver Station (BTS), Access Point (AP), transmission points, transmission nodes, Radio Remote Unit (RRU), Remote Radio Head (RRH), nodes in Distributed Antenna System (DAS), etc.

User equipment/wireless device: In some embodiments the non-limiting terms wireless device and User Equipment (UE) are used and they refer to any type of wireless device communicating with an Access Node (AN) and/or with another UE in a wireless communications network. Examples of UE/wireless device are Device-to-Device (D2D) UE, machine type UE or UE capable of machine to machine (M2M) communication, Personal Digital Assistant (PDA), Tablets, mobile terminals, smart phones, Laptop Embedded Equipped (LEE), Laptop Mounted Equipment (LME), Universal Serial Bus (USB) dongles etc. In this disclosure the terms wireless device and UE are used interchangeably.

General

Note that although terminology from 3GPP LTE has been used in this disclosure to exemplify embodiments, this should not be seen as limiting the scope of the invention to only the aforementioned system. Other wireless communications networks, comprising Wideband Code Division Multiple Access (WCDMA), High Speed Packet Access (HSPA), Worldwide Interoperability for Microwave Access (WiMax), WiFi, Wireless Local Area Network (WLAN), and Global System for Mobile Communications (GSM)/ GSM EDGE Radio Access Network (GERAN), may also benefit from exploiting the ideas covered within this disclosure.

Also note that terminology such as e.g. eNodeB and UE should be considering non-limiting and does in particular not imply a certain hierarchical relation between the two; in general "eNodeB" could be considered as device 1 and "UE" device 2, and these two devices communicate with each other over some radio channel.

Further, the embodiments are described in the context of single carrier operation of the wireless device. However, the embodiments are applicable for multi-carrier or carrier aggregation operation of the wireless device. Therefore, the embodiment methods of signaling information to the wireless device or to another AN may be carried out independently for each cell on each carrier frequency supported by the AN.

In the following section, embodiments herein will be illustrated in more detail by a number of exemplary embodiments. It should be noted that these embodiments are not mutually exclusive. Components from one embodiment may be assumed to be present in another embodiment and it will be obvious to a person skilled in the art how those components may be used in the other exemplary embodiments.

Figure 2:
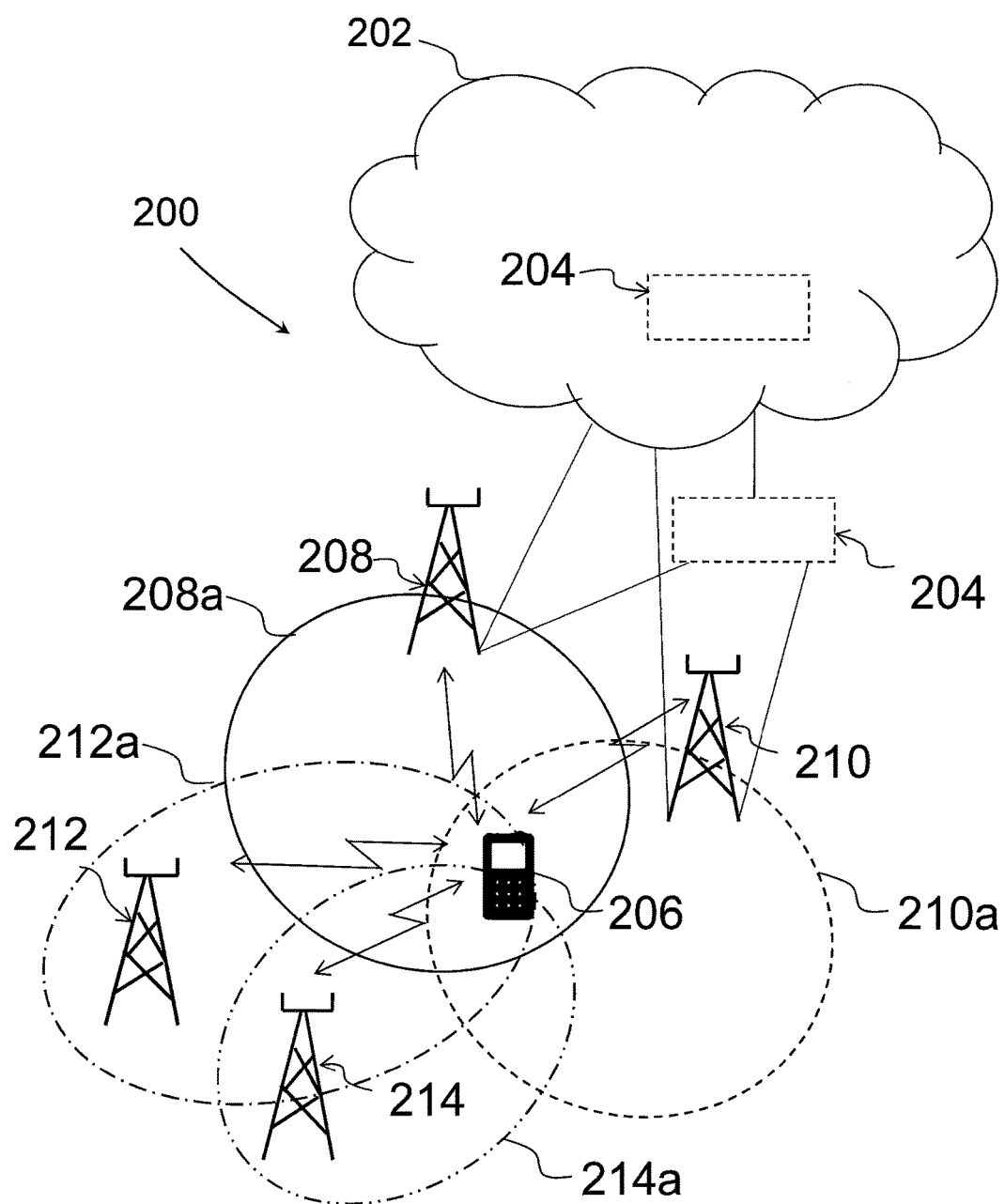
FIG. 2 schematically illustrates an embodiment of a wireless communications system.

FIG. 2 depicts an example of a communications network 200 in which embodiments herein may be implemented. The communications network 200 may be a wireless communications network and may be or comprise an LTE network, a WCDMA network, a GSM network, any 3GPP cellular network, WiMAX network, or any other wireless network.

A core network 202 is comprised in the communications network 200. The core network 202 may be a wireless core network such as an LTE core network, e.g. a Evolved Packet Core (EPC); a WCDMA core network; a GSM core network; any 3GPP core network; WiMAX core network; or any cellular core network.

A core network node 204 is comprised in the core network 202. The core network node 204 may be a Mobile Switching Center (MSC), a Mobility Management Entity (MME), an Operation & Maintenance (O&M) node, a Serving GateWay (S-GW), a Serving General Packet Radio Service (GPRS) Node (SGSN), etc.

A wireless device 206 also referred to as a user equipment or UE is located in the communications network 200. The wireless device 206 may e.g. be a user equipment, a mobile terminal or a wireless terminal, a mobile phone, a computer such as e.g. a laptop, a Personal Digital Assistants (PDAs) or a tablet computer, sometimes referred to as a surf plate, with wireless capability, or any other radio network units capable to communicate over a radio link in a wireless communications network. It should be noted that the term user equipment used in this document also covers other wireless devices such as Machine to Machine (M2M) devices, even though they are not handled by any user.

A first Access Node (AN) 208 is comprised in the wireless communications network 200. The first AN 208 is configured to operate in the wireless communications network 200. A second AN 210 may be comprised in the wireless communications network 200. Further, one or more other ANs, e.g. a third AN 212 and a fourth AN 214, may be comprised in the communications network. The AN 208, 210,212,214 may each be a radio access node such as a radio base station, for example an eNB, an eNodeB, or a Home Node B, an Home eNode B or any other network node capable to serve a user equipment or a machine type communication device in a communications network.

The ANs 208,210,212,214 may each be a Radio Network Node (RNN) and may be configured for wireless communication with one or more wireless devices, such as the wireless device 206, when the wireless device 206 is located within a geographical area 208a,210a,212a,214a, served by the respective network node 208,210,212,214. Herein, this is also specified as the AN 208,210,212,214 manages or is configured to manage communication with one or more wireless devices in the respective geographical area 208a, 210a,212a,214a. In this disclosure, the geographical areas 208a,210a,212a,214a are sometimes referred to as first, second, third and fourth geographical areas; first, second, third and fourth coverage areas; or to as first, second, third and fourth cells.

Figure 3:
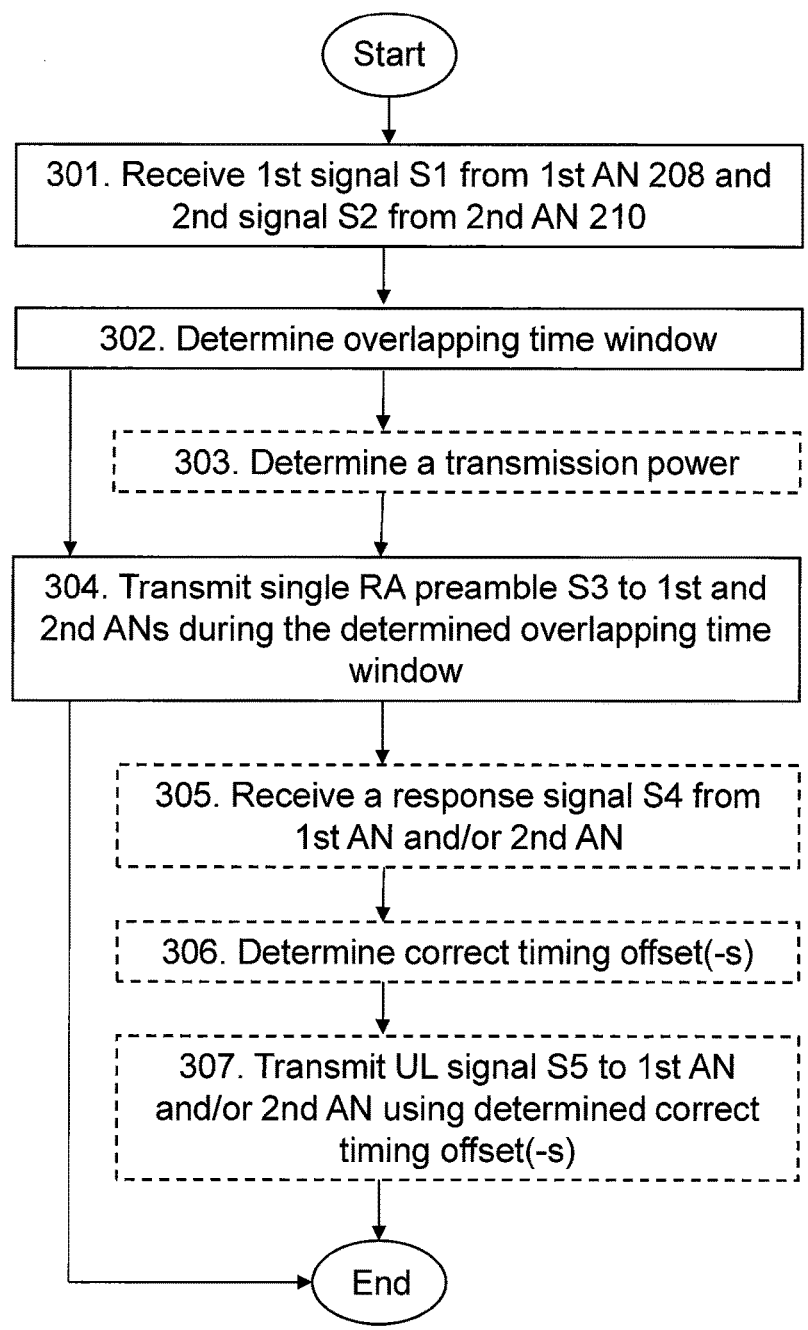
FIG. 3 is a flowchart depicting embodiments of a method performed by a wireless device.
Figure 8:
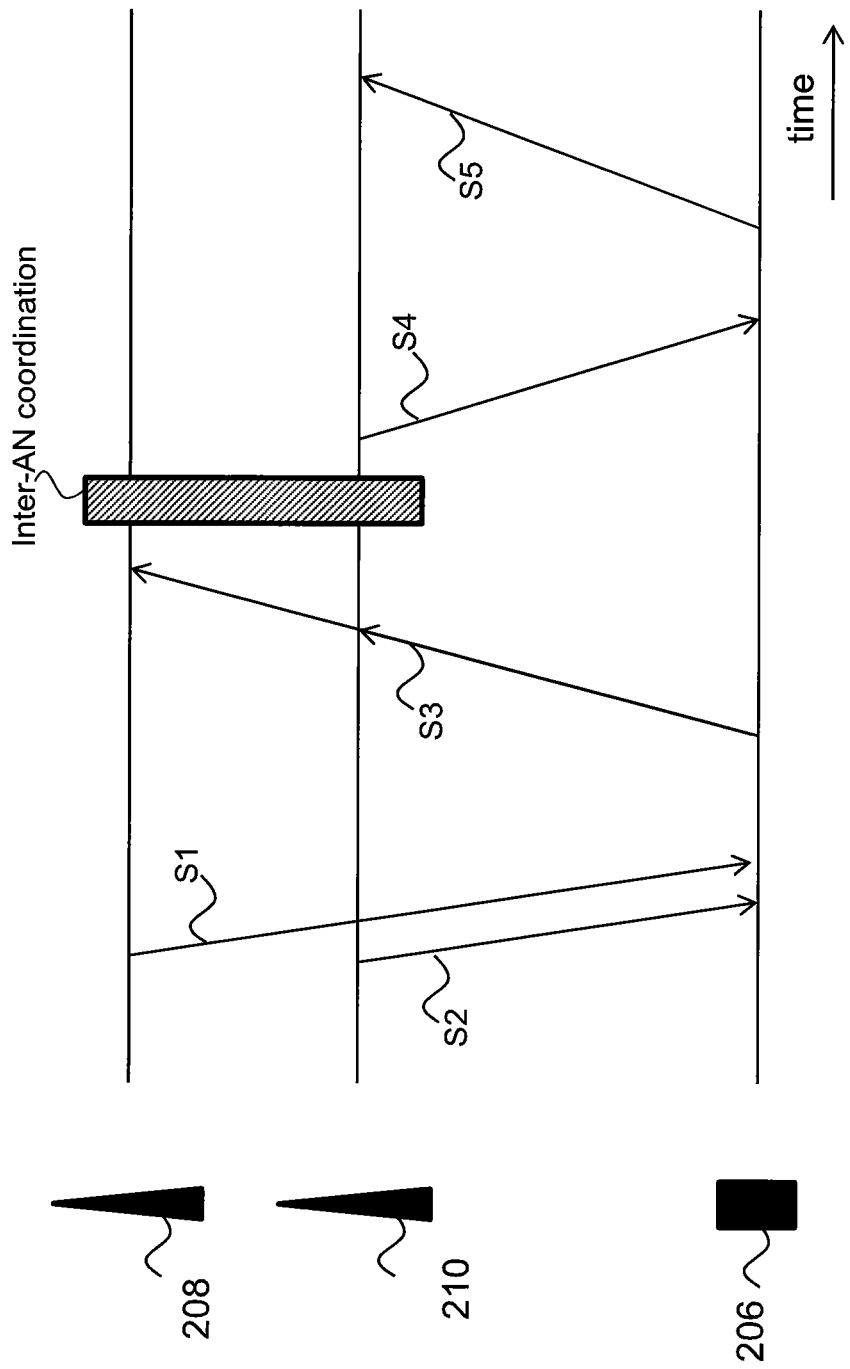
FIG. 8 schematically illustrates a combined block diagram and signalling scheme according to some exemplifying first embodiments.
Figure 9:
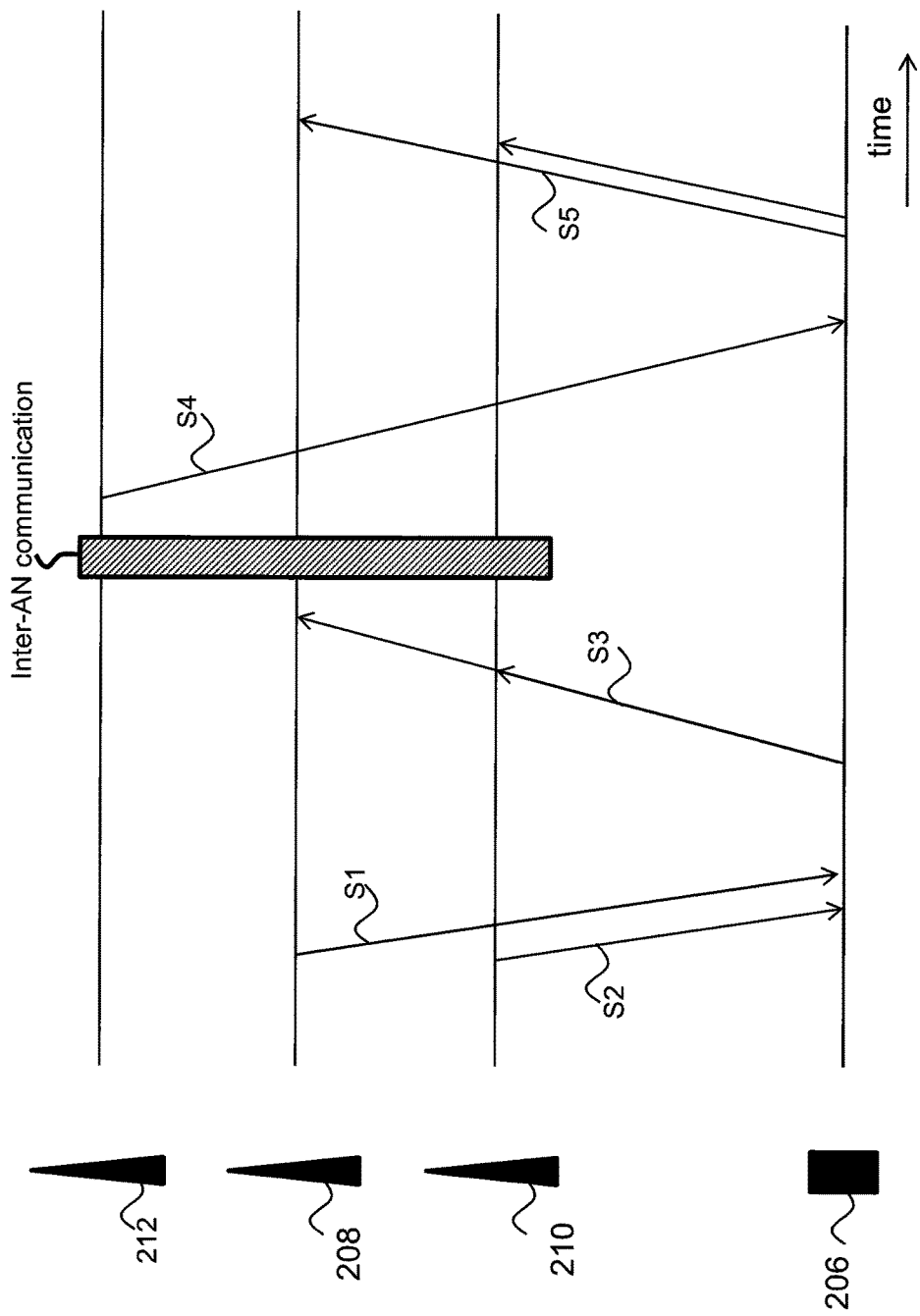
FIG. 9 schematically illustrates a combined block diagram and signalling scheme according to some exemplifying second embodiments.
Figure 10:
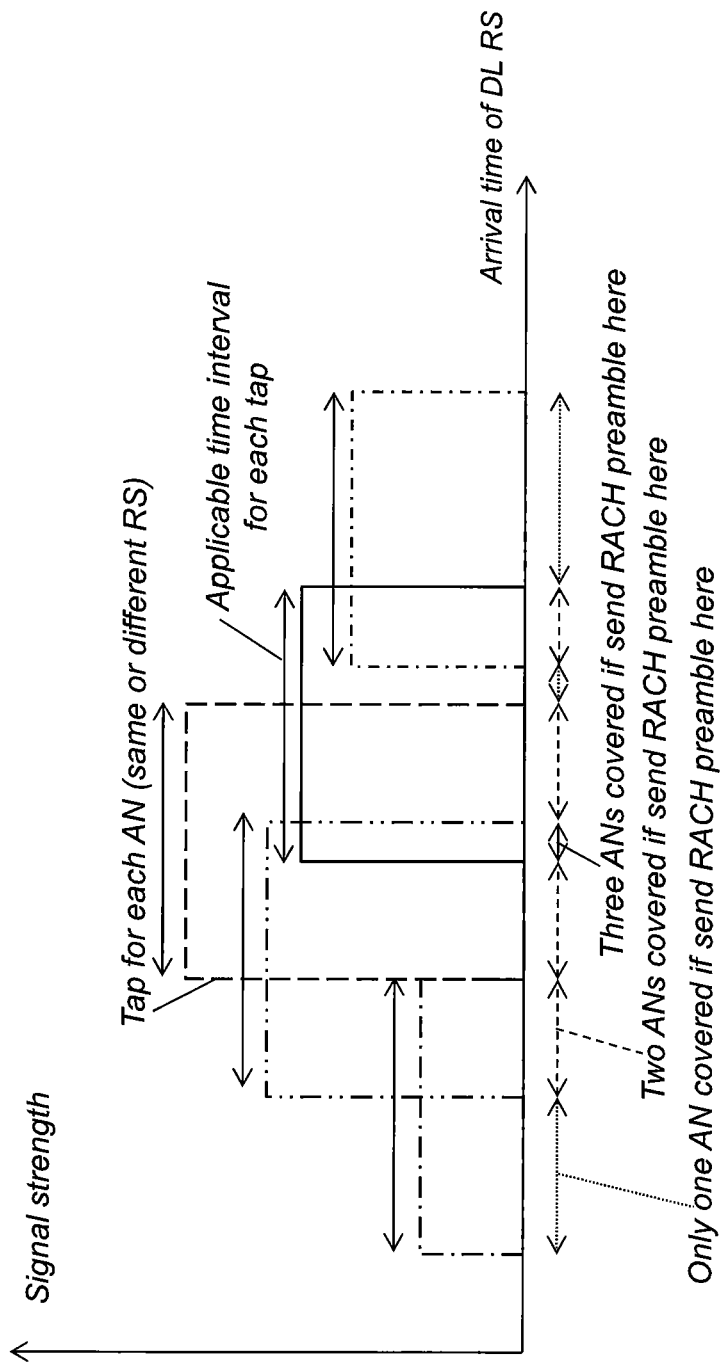
FIG. 10 schematically illustrates how an overlapping time window may be determined according to some embodiments.

An example of a method performed by the wireless device 206 for enabling a single RA preamble to be received by the first AN 208 and by a second AN 210 will now be described with reference to a flowchart depicted in FIG. 3. Reference will also be made to FIGS. 8-9 which schematically illustrate exemplifying signalling between the wireless device 206 and the respective ANs 208,210, and to FIG. 10 schematically illustrating the determination of an overlapping time window. The first and second ANs 208,210 are asynchronous ANs, and the wireless device 206, the first and second ANs 208,210 are operating in the wireless communications network 200.

The single RA preamble may sometimes herein be referred to as a single preamble of a RA request or a single PRACH preamble. Further, the single RA preamble may sometimes in this disclosure be referred to as being a shared RA preamble meaning that a transmission of the single RA preamble is received at several ANs, e.g. the first and second ANs 208,210, and thus the single RA preamble received at the first and second ANs 208,210 is referred to as being shared by the first and second ANs 208,210. Furthermore, the preamble may sometimes herein be referred to as a reference signal or a pilot.

The methods comprise one or more of the following actions. For example, in some embodiments, one or more of Actions 303, 305, 306 and 307 indicated with dashed lines in FIG. 3 are optional. Further, it should be understood that actions may be taken in any suitable order and that some actions may be combined.

Action 301

The wireless device 206 receives a first signal S1 from the first AN 208 and a second signal S2 from the second AN 210. This is schematically illustrated in FIGS. 8 and 9.

The first and second signals S1, S2 may be a respective downlink signal such as a signal comprising system signature sequence index (SSI) e.g. system specific SSI or AN specific SSI, a reference signal, a Primary Synchronization Signal (PSS) or a Secondary Synchronization Signal (SSS).

The first and second signals S1, S2 may be the same signal or different signals. If the first and second signals S1, S2 are the same signal, the wireless device 206 may treat the first and second ANs 208,210, e.g. the different cells, as taps of channel response for the same signal, e.g. for the same reference signal. On the other hand, if the first and second signals S1, S2 are different signals, the wireless device 206 may treat the first and second ANs 208,210, separately.

Action 302

Based on the received first and second signals S1,S2, the wireless device 206 determines an overlapping time window during which a transmission from the wireless device 206 is receivable by the first and second ANs 208,210.

The wireless device 206 may determine the overlapping time window such that a transmission from the wireless device 206 is simultaneously receivable by the first and second ANs 208,210. By the expression "simultaneously receivable" when used in this disclosure is meant that the transmission from the wireless device 206 is receivable at the first and second ANs 208,210 at the same point in time or within a short period of time period, Especially, the expression "simultaneously receivable" means that several ANs, e.g. the first and second ANs 208,210, receive the preamble, e.g. the same preamble, and that the wireless device, e.g. the wireless device 206, does not need to send a first preamble to the first AN 208 and second preamble to the second AN 210.

In some embodiments, for example when the wireless device starts to transmit the preamble, the wireless device 206 may determine the overlapping time window as a time interval where a first relative timing interval TI_rel_AN1 for the first AN 208 and a second relative timing interval TI_rel_AN2 for the second AN 210 are overlapping. The first relative timing interval TI_rel_AN1 may be determined as a difference between the timing T_S_AN1 of the first signal S1 for the first AN 208 and a range X, where X is a maximum value of allowed timing offsets. The second relative timing interval TI_rel_AN2 may be determined as a difference between the timing T_S_AN2 of the second signal S2 the second AN 210 and a range X, where X is a maximum value of allowed timing offsets. A preamble transmit time T_TX_preamble may be selected within the overlapping time window. The selected preamble transmit time T_TX_preamble may decide the first initial timing advance TA_ini_AN1 for the second AN1 and the second initial timing advance TA_ini_AN2 for the second AN2, as TA_ini_AN1=T_S_AN1−T_TX_preamble, and TA_ini_AN2=T_S_AN2−T_TX_preamble, respectively. Further, the first and second initial timing offsets TA_ini_AN1, TA_ini_AN2 may values in the range of −X to 0, wherein X is a maximum value of allowed timing offsets. In some embodiments, X is a value pre-known by the wireless device 206 via system information or a value pre-defined by specification.

Sometimes herein the timing offset is referred to as a Timing Advance (TA), or a TA value, and the expressions may be used interchangeably.

The wireless device 206 may determine the overlapping time window to maximize a number of ANs 208,210,212,214 it covers, wherein each covered AN 208,210,212,214 is operating in the wireless communications network 200. This may also be expressed as the wireless device 206 may determine the overlapping time window to maximize the number of ANs 208,210,212,214 that are reachable by the wireless device 206, e.g. that are within reach of a transmission from the wireless device 206.

Additionally or alternatively, the wireless device 206 may determine the overlapping time window to maximize a sum of weights of ANs 208,210,212,214 it covers, wherein each covered AN 208,210,212,214 is operating in the wireless communications network 200 and associated with a weight relating to a signal parameter. The signal parameter may for example be a signal strength parameter, or a signal quality parameter This is schematically illustrated in FIG. 10. In FIG. 10 it is schematically illustrated how the overlapping time window may be determined. Further, FIG. 10 schematically illustrates the single strength at the wireless device 206 of the respective tap for a plurality of ANs, and the applicable time interval for each tap.

If the overlapping time window is determined to correspond to one of time windows indicated by the dotted arrows, only one AN will be covered and thus only one AN will receive the single RA preamble if it is transmitted during that overlapping time window.

Further, if the overlapping time window is determined to correspond to one of time windows indicated by the dashed arrows, two ANs will be covered and thus two ANs will receive the single RA preamble if it is transmitted during that overlapping time window.

Furthermore, if the overlapping time window is determined to correspond to the time window indicated by the solid arrow, three ANs will be covered and thus here ANs will receive the single RA preamble if it is transmitted during that overlapping time window.

Action 303

In some embodiments, the wireless device 208 determines a transmission power for a single RA preamble S3 based on signal strengths of the received first and second signals S1,S2. This may for example be the case when power control is needed for the RA preamble.

For example, the wireless device 206 may determine the transmission power for the single RA preamble S3 using a general open loop power control, wherein the initial preamble transmission power setting is based on an open-loop estimation with full compensation for the path-loss. This may be designed to ensure that the received power of the preambles is independent of the path-loss.

Action 304

The wireless device 206 transmits the single RA preamble S3 to the first and second ANs 208,210 during the determined overlapping time window.

In some embodiments, wherein the wireless device 206 has determined the transmission power as described above in relation to Action 303, the wireless device 206 transmits the single RA preamble S3 with the determined transmission power.

This is schematically illustrated in FIGS. 8 and 9.

Action 305

The wireless device 206 may, in response to the transmitted single RA preamble S3, receive a response signal S4 from the first AN 208 and/or the second AN 210. The response signal S4 may comprise a first fictive timing offset TA_fictive_AN1 relating to the first AN 208 and/or a second fictive timing offset TA_fictive_AN2 relating to the second AN 210.

The response signal S4 may be or comprise a Random Access Response (RAR).

This is schematically illustrated in FIGS. 8 and 9.

Action 306

The wireless device 206 may, in response to the transmitted single RA preamble S3, determine a first correct timing offset TA_correct_AN1 for the first AN 208 as the difference between the first fictive timing offset TA_fictive_AN1 and the first initial timing offset TA_ini_AN1, or/and a second correct timing offset TA_correct_AN2 for the second AN 210 as the difference between the second fictive timing offset TA_ficitive_AN2 and the second initial timing offset TA_ini_AN2. Thereby, correct timing offsets TA_correct_AN1, TA_correct_AN2 are determined for the first or/and second ANs 208,210 with a single RA preamble.

Action 307

In some embodiments, the wireless device 206 transmits an uplink signal S5 to the first AN 208 and/or the second AN 210 using the respective determined first correct timing offset TA_correct_AN1 and/or determined second correct timing offset TA_correct_AN2.

The uplink signal S5 may be or comprise a Message 3 (MSG3) or a Sounding Reference Signal (SRS).

This is schematically illustrated in FIGS. 8 and 9.

Figure 4:
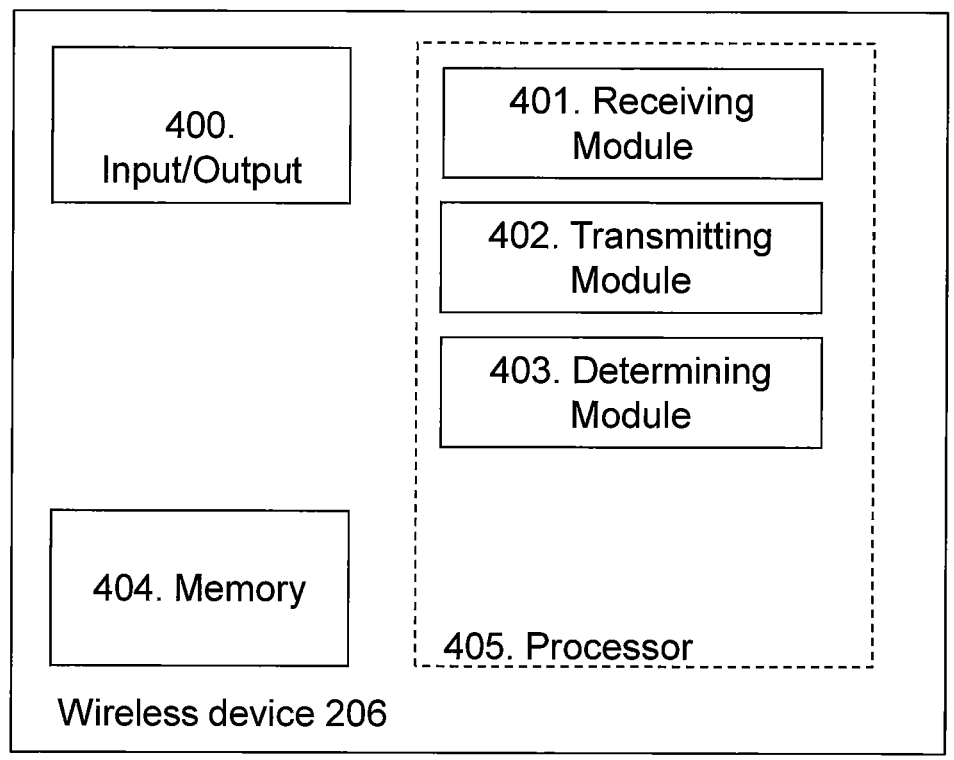
FIG. 4 is a schematic block diagram illustrating embodiments of a wireless device.

To perform the method for enabling the single RA preamble to be received by the first AN 208 and by the second AN 210, the wireless device 206 may be configured according to an arrangement depicted in FIG. 4. The first and second ANs 208,210 are asynchronous ANs, and the wireless device 206, the first and second ANs 208,210 are operating in the wireless communications network 200.

The wireless device 206 comprises an input and/or output interface 400 configured to communicate with one or more wireless devices, one or more ANs, e.g. the first and second ANs 208, 210, and one or more other network nodes, such as the core network node 204. The input and/or output interface 400 may comprise a wireless receiver (not shown) and a wireless transmitter (not shown).

The wireless device 206 is configured to receive, by means of a receiving module 401 configured to receive, a first signal S1 from the first AN 208 and a second signal S2 from the second AN 210. The receiving module 401 may be implemented by or arranged in communication with a processor 405 of the wireless device 206. The processor 405 will be described in more detail below.

In response to a transmitted single RA preamble S3, the wireless device 206 may be configured to receive a response signal S4 from the first AN 208 and/or the second AN 210, which response signal S4 comprises a first fictive timing offset TA_fictive_AN1 relating to the first AN 208 and/or a second fictive timing offset TA_fictive_AN1 relating to the second AN 210.

The wireless device 206 is configured to transmit, by means of a transmitting module 402 configured to transmit, the single RA preamble S3 to the first and second ANs 208,210 during a determined overlapping time window. The transmitting module 402 may be implemented by or arranged in communication with the processor 405 of the wireless device 206.

In some embodiments, the wireless device 206 is configured to transmit the single RA preamble S3 with a determined transmission power.

The wireless device 206 may further be configured to transmit an uplink signal S5 to the first AN 208 and/or the second AN 210 using a respective determined first correct timing offset TA_correct_AN1 and/or determined second correct timing offset TA_correct_AN2. The determination of the first correct timing offset TA_correct_AN1 and/or determined second correct timing offset TA_correct_AN2 will be described below.

The wireless device 206 is configured to determine, by means of a determining module 403 configured to determine, based on the received first and second signals S1,S2, an overlapping time window during which a transmission from the wireless device 206 is receivable by the first and second ANs 208,210. The determining module 403 may be implemented by or arranged in communication with the processor 405 of the wireless device 206.

In some embodiments, the wireless device 206 is configured to determine the overlapping time window as a time interval where a first relative timing interval TI_rel_AN1 for the first AN 208 and a second relative timing interval TI_rel_AN2 for the second AN 210 are overlapping. The first relative timing interval TI_rel_AN1 may be determined by the timing T_S_AN1 of the first signal S1 and a range value X, where X is a maximum value of allowed timing offsets. The second relative timing interval TI_rel_AN2 may be determined by the timing T_S_AN2 of the second signal S2 and a range value X, where X is a maximum value of allowed timing offsets. The preamble transmit time T_TX_preamble is selected among the overlapped time window. The selected T_TX_preamble may decide the first initial timing advance TA_ini_AN1 for the second AN1 and the second initial timing advance TA_ini_AN2 for the second AN2. The first and second initial timing offsets TA_ini_AN1, TA_ini_AN2 may be values in the range of −X to 0 microseconds, wherein X is a maximum value of allowed timing offsets. In some embodiments, the wireless device 206 is configured to receive the X value via system information or to be configured with the X value.

The wireless device 206 may further be configured to determine the overlapping time window to maximize a number of ANs 208,210,212,214 it covers, wherein each covered AN 208,210,212,214 is operating in the wireless communications network 200.

Alternatively, the wireless device 206 may be configured to determine the overlapping time window to maximize a sum of weights of ANs 208,210,212,214 it covers, wherein each covered AN 208,210,212,214 is operating in the wireless communications network 200 and associated with a weight relating to a signal parameter.

In some embodiments, the wireless device 206 is configured to determine a transmission power for the single RA preamble S3 based on signal strengths of the received first and second signals S1,S2.

Based on a received response signal S4 from the first AN 208 and/or the second AN 210, which response signal S4 comprises a first fictive timing offset TA_fictive_AN1 relating to the first AN 208 and/or a second fictive timing offset TA_fictive_AN2 relating to the second AN 210, the wireless device 206 may be configured to determine a first correct timing offset TA_correct_AN1 for the first AN 208 as the difference between the first fictive timing offset TA_fictive_AN1 and the first initial timing offset TA_ini_AN1, or/and a second correct timing offset TA_fictive_AN1 for the second AN 210 as the difference between the second fictive timing offset TA_fictive_AN2 and the second initial timing offset TA_ini_AN1. Thereby, correct timing offsets are determined for the first or/and second ANs 208,210 with a single RA preamble.

The wireless device 206 may also comprise means for storing data. In some embodiments, the wireless device 206 comprises a memory 404 configured to store the data. The data may be processed or non-processed data and/or information relating thereto. The memory 404 may comprise one or more memory units. Further, the memory 404 may be a computer data storage or a semiconductor memory such as a computer memory, a read-only memory, a volatile memory or a non-volatile memory. The memory is arranged to be used to store obtained information, data, configurations, schedulings, and applications etc. to perform the methods herein when being executed in the wireless device 206.

Embodiments herein for enabling the single RA preamble to be received by the first AN 208 and by the second AN 210 may be implemented through one or more processors, such as the processor 405 in the arrangement depicted in FIG. 4, together with computer program code for performing the functions and/or method actions of embodiments herein. The program code mentioned above may also be provided as a computer program product, for instance in the form of a data carrier carrying computer program code for performing the embodiments herein when being loaded into the wireless device 206. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the wireless device 206.

Those skilled in the art will also appreciate that the input/output interface 400, the receiving module 401, the transmitting module 402, and the determining module 403 above may refer to a combination of analog and digital circuits, and/or one or more processors configured with software and/or firmware, e.g. stored in the memory 404, that when executed by the one or more processors such as the processors in the wireless device 206 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Figure 5:
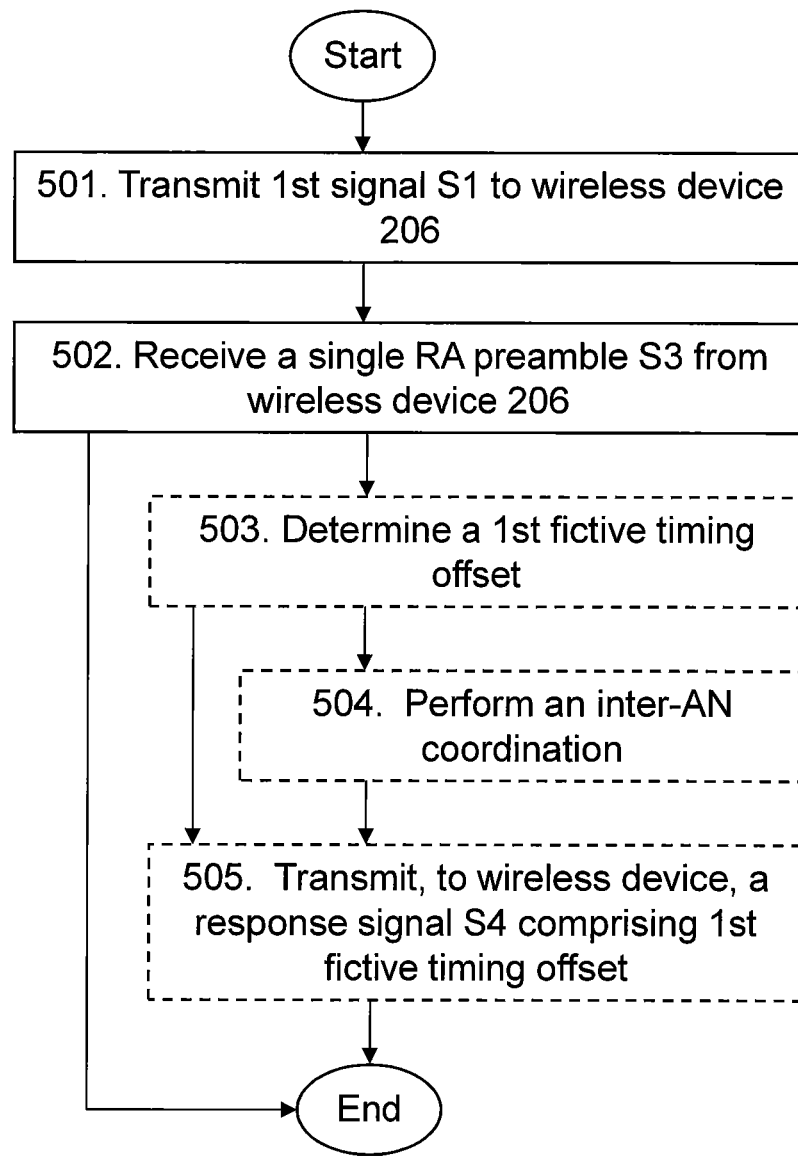
FIG. 5 is a flowchart depicting embodiments of a method performed by a first AN.

An example of a method performed by the first AN 208 for enabling the single RA preamble transmitted from the wireless device 206 to be received by the first AN 208 and by the second AN 210 will now be described with reference to a flowchart depicted in FIG. 5. The first and second ANs 208,210 are asynchronous ANs, and the wireless device 206, the first and second ANs 208,210 are operating in the wireless communications network 200. The method comprises one or more of the following action. For example, in some embodiments, one or more of Actions 503, 504, and 505 indicated with dashed lines in FIG. 5 are optional. Further, it should be understood that actions may be taken in any suitable order and that some actions may be combined.

Action 501

The first AN 208 transmits a first signal S1 to the wireless device 206.

The first signal S1 may be a downlink signal such as a signal comprising SSI, e.g. system specific SSI or AN specific SSI, PSS or SSS.

Thus, the first AN 208 may transmit the first signal S1 to inform the wireless device 206 about system information such as Access Information Table (AIT), Master Information Block (MIB), or System Information Block (SIB).

Action 502

The first AN 208 receives a single RA preamble S3 from the wireless device 206 during an overlapping time window during which a transmission from the wireless device 206 is receivable by the first and second ANs 208,210.

Action 503

Based on the received single RA preamble S3, the first AN 208 determines a first fictive timing offset TA_fictive_AN1 relating to the first AN 208.

For example, if the first AN 208 expects to receive the single RA preamble at an expected time T_exp_AN1, and the time that the first AN 208 received the preamble is T_rec_AN1, then the fictive timing offset may be determined as $$TA\_\text{fictive}\_AN1 = T\_rec\_AN1 - T\_exp\_AN1.$$

Since the first AN 208 does not know whether or not the wireless device 206 is adjusted, the first AN 208 may determine the first fictive timing offset TA_ficitive_AN1 to correspond to the timing offset determined in accordance with a legacy system, e.g. in accordance with a LTE system.

Action 504

In order to determine which AN, e.g. the first AN 208 and/or the second AN 210, that is to respond to a received single RA preamble, and in some embodiments, the first AN 208 performs an inter-AN coordination to determine whether the first AN 208 and/or the second AN 210 is to transmit the response signal S4. In other words, the first AN 208 performs a coordination with other ANs, e.g. the second AN 210, to determine whether the first AN 208 and/or the second AN 210 is to transmit the response signal S4. This may also be expressed as the first AN 208 performs an inter-AN communication, e.g. a communication with one or more other ANs, to determined which AN that is to respond to the wireless device.

Action 505

The first AN 208 transmits a response signal S4 to the wireless device 206, which response signal S4 comprises the first fictive timing offset TA_ficitive_AN1. Thus, the response signal S4 comprises the determined first fictive timing offset TA_ficitive_AN1.

In some embodiments, wherein the first AN 208 performs the inter-AN coordination as described in Action 504 above, the first AN 208 may transmit the response signal S4 based on the performed inter-AN coordination, e.g. based on the result of the performed inter-AN coordination.

Figure 6:
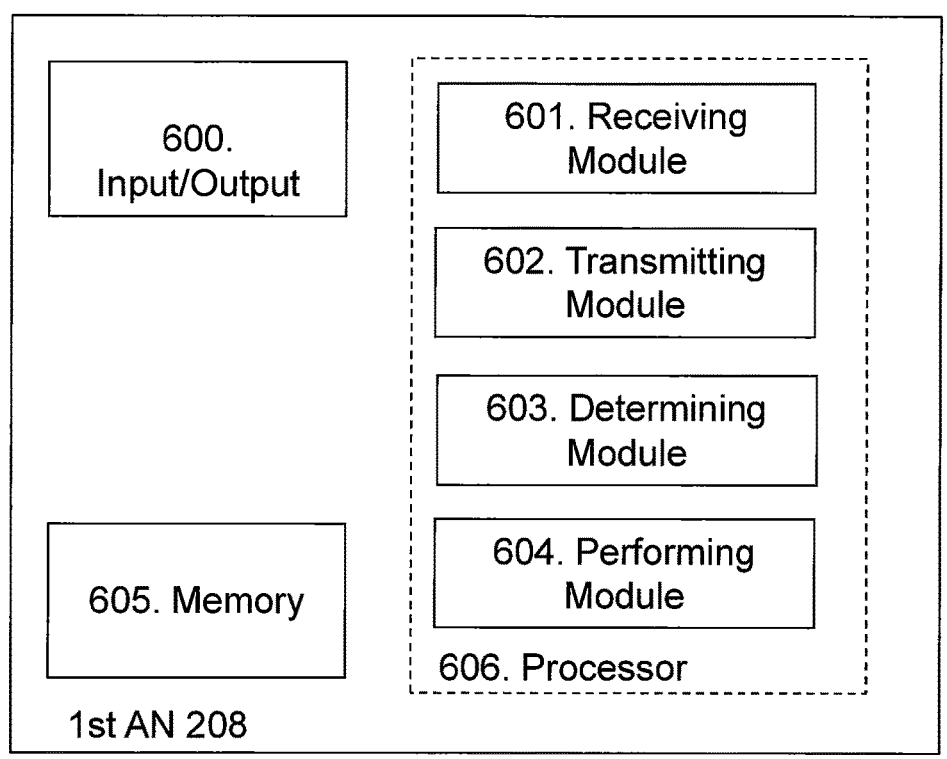
FIG. 6 is a schematic block diagram illustrating embodiments of a first AN.

To perform the method for enabling the single RA preamble transmitted from the wireless device 206 to be received by the first AN 208 and by the second AN 210, the first AN 208 may be configured according to an arrangement depicted in FIG. 6. As previously described, the first and second ANs 208,210 are asynchronous ANs, and the wireless device 206, the first and second ANs 208,210 are operable in the wireless communications network 200.

In some embodiments, the first AN 208 comprises an input and/or output interface 600 configured to communicate with one or more wireless devices, e.g. the wireless device 206, one or more ANs, e.g. one or more of the ANs 210,212,214, and one or more other network nodes, such as the core network node 204. The input and/or output interface 600 may comprise a wireless receiver (not shown) and a wireless transmitter (not shown).

In some embodiments, the first AN 208 is configured to receive, e.g. by means of a receiving module 601 configured to receive, a single RA preamble S3 from the wireless device 206 during an overlapping time window during which a transmission from the wireless device 206 is receivable by the first and second ANs 208,210. The receiving module 601 may comprise a wireless receiver.

The first AN 208 is configured to transmit, e.g. by means of a transmitting module 602 configured to transmit, a first signal S1 to the wireless device 206. The transmitting module 602 may comprise a wireless transmitter.

In some embodiments, the first AN 208 is configured transmit a response signal S4 to the wireless device 206, which response signal S4 comprises a first fictive timing offset TA_ficitive_AN1. The response signal S4 may be transmitted in response to the received single RA preamble S3.

When an inter-AN coordination has been performed in order to determine whether the first AN 208 and/or the second AN 210 is to transmit the response signal S4, the first AN 208 is configured to transmit the response signal S4 based on the performed inter-AN coordination, e.g. based on the result of the performed inter-AN coordination.

The first AN 208 is configured to determine, by means of a determining module 603 configured to determine, based on the received single RA preamble S3, the first fictive timing offset TA_ficitive_AN1 relating to the first AN 208. The determining module 603 may be implemented by or arranged in communication with a processor 606 of the first AN 208. The processor 606 will be described in more detail below.

The first AN 208 is configured to perform, by means of a performing module 604 configured to perform, an inter-AN coordination to determine whether the first AN 208 and/or the second AN 210 is to transmit the response signal S4. The inter-AN coordination is sometimes in this disclosure referred to as inter-AN communication. The performing module 604 may be implemented by or arranged in communication with the processor 606 of the first AN 208.

The first AN 208 may also comprise means for storing data. In some embodiments, the first AN 208 comprises a memory 605 configured to store the data. The data may be processed or non-processed data and/or information relating thereto. The memory 605 may comprise one or more memory units. Further, the memory 605 may be a computer data storage or a semiconductor memory such as a computer memory, a read-only memory, a volatile memory or a non-volatile memory. The memory is arranged to be used to store obtained information, data, configurations, schedulings, and applications etc. to perform the methods herein when being executed in the first AN 208.

Embodiments herein for enabling the single RA preamble S3 transmitted from the wireless device 206 to be received by the first AN 208 and by the second AN 210 may be implemented through one or more processors, such as the processor 606 in the arrangement depicted in FIG. 6, together with computer program code for performing the functions and/or method actions of embodiments herein. The program code mentioned above may also be provided as a computer program product, for instance in the form of a data carrier carrying computer program code for performing the embodiments herein when being loaded into the first AN 208. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the first AN 208.

Those skilled in the art will also appreciate that receiving module 601, the transmitting module 602, the determining module 603, and the performing mode 604 above may refer to a combination of analog and digital circuits, and/or one or more processors configured with software and/or firmware, e.g. stored in the memory 605, that when executed by the one or more processors such as the processors in the first AN 208 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Figure 7:
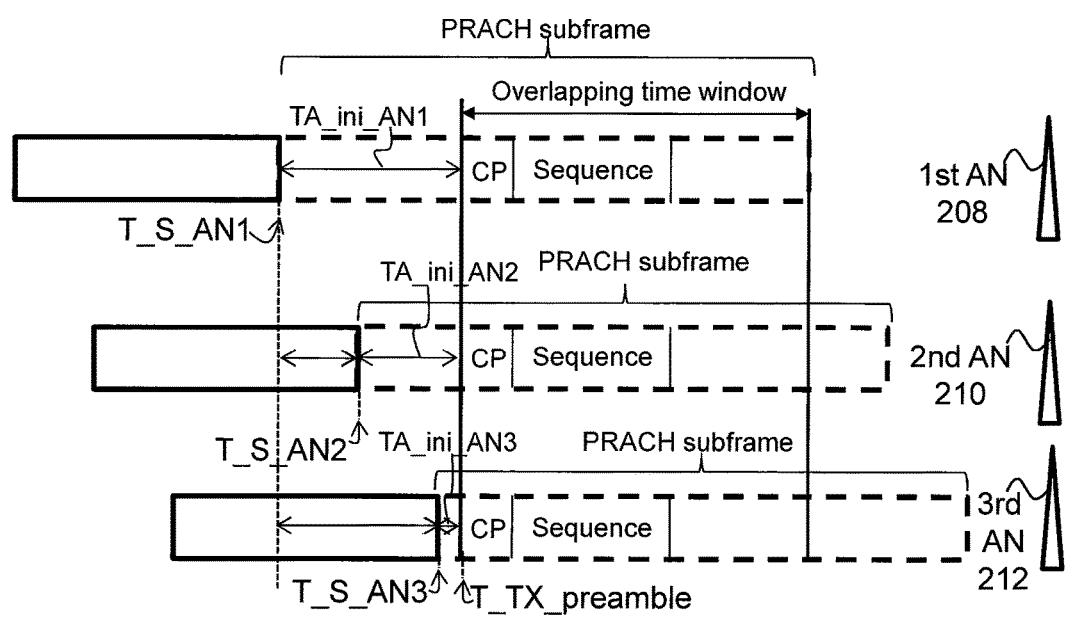
FIG. 7 schematically illustrates timing offset for the single RA preamble according to some embodiments.

FIG. 7 schematically illustrates timing offsets for the single RA preamble according to some embodiments disclosed herein. As illustrated in FIG. 7, there is different initial time advance TA_ini_AN1, TA_ini_AN2, TA_ini_AN3 for the different ANs, e.g. AN 208,210,212, but the wireless device 206 only needs to transmit one preamble since the transmitted time is overlapped by adjusting the initial time advance. In FIG. 7, the wireless device 206 sends the preamble at the preamble transmit time T_TX_preamble. In some embodiments, the preamble transmit time T_TX_preamble is determined as T_TX_preamble=T_S_AN1−TA_ini_AN1=T_S_AN2−TA_ini_AN2=T_S_AN3−TA_ini_AN3. In FIG. 8, the different initial time advance TA_ini_AN1, TA_ini_AN2, TA_ini_AN3 values are negative values, and thus the preamble transmit time T_TX_preamble may be determined as T_TX_preamble=T_S_AN1+TA_ini_AN1=T_S_AN2+TA_ini_AN2=T_S_AN3+TA_ini_AN3.

EXEMPLIFYING EMBODIMENTS

To further explain embodiments disclosed herein, two exemplifying embodiments will now be described with reference to FIGS. 8 and 9. As previously mentioned FIGS. 8-9 schematically illustrate exemplifying signalling between the wireless device 206 and the respective ANs 208,210.

Some Exemplifying First Embodiments Relating to Initial Random Access Under the System Control Plane Framework The first signal S1 and the second signal S2 is transmitted to the wireless device 206 from the first and second ANs 208,210, respectively. Thus, the wireless device 206 receives a respective DL signal S1,S2 from the first AN 208 and the second AN 210, respectively. This relates to Actions 301 and 501 described above.

By means of the respective received signals S1 and S2, the wireless device 206 is able get a respective DL sync for the first and second ANs 208,210. By the expression "DL sync" when used in this disclosure is meant the time and frequency synchronization. Since the same reference signal, e.g. the first and second signals S1 and S2 are the same signals, is used by the first and second ANs 208,210, they may be seen as different taps of a channel response from the perspective of the wireless device 206.

Based on the respective DL sync T_S_AN1, T_S_AN2 from the first and second ANs 208,210, respectively, the wireless device 206 may determine the relative timing interval TI_rel_AN1, TI_rel_AN2 for the single RA preamble transmission for each AN 208,210 by the DL sync and a range X, where X is a maximum value of allowed timing offsets. X is pre-known by the wireless device 206 via system information or pre-defined by specification.

For the first AN 208, the first relative timing interval TI_rel_AN1 is given by the determined DL sync T_S_AN1 of the first AN 208 and a range X, where X is a maximum value of allowed timing offset.

For the second AN 210, a second relative timing interval TI_rel_AN2 is given by DL sync T_S_AN2 of the second AN 210 and a range X, where X is a maximum value of allowed timing offset.

An overlapping time window is determined by the second relative timing interval TI_rel_AN1 for the first AN 208 and the second relative timing interval TI_rel_AN2 for the second AN 210. By adjusting the preamble transmit time T_TX_preamble, the first initial timing advanced TA_ini_AN1 and/or the second initial timing advanced TA_ini_AN2 may be decided.

If an overlapping time window is found to match both the first and the second ANs 208,210, that overlapping time window will be used by the wireless device 206 for the RA preamble transmission.

However, when there are several ANs 208,210,212,214, the case may be that an overlapping time window cannot be found for all of them, then the wireless device 206 may prioritize according to a predefined, rule. This is schematically illustrated in FIG. 10. For example, the wireless device 206 may select an overlapping time window that maximizes the number of covered AN. In such case, the wireless device 206 should select the overlapping time window indicated with a solid arrow in FIG. 10 for which three ANs will be covered. As another example, the wireless device 208 may select an overlapping time window that maximizes the sum weight of covered ANs, wherein each AN is given a weight taking into account different aspects and/or factors, e.g., weight assigned based on the signal strength. In FIG. 10, the overlapping time window wherein 3 ANs are covered should be selected also for this case.

During the determined overlapping time window, one single RA preamble S3 is sent from the wireless device 206. This relates to e.g. Action 304 described above.

The wireless device 206 may determine the transmission power for the single RA preamble S3 based on different criterion. This relates to e.g. Action 303 described above.

In order to improve the energy efficiency of the wireless device 206, the transmission power may be decided according to the strongest reference signal (different reference signals from different ANs or taps if same reference signal used by different ANs), i.e., the transmission power $P_{RA\ preamble}$ of the single RA preamble is determined as $$P_{RA\ preamble} = \min\{P_{CMAX,c}(i), PREAMBLE\_RECEIVED\_TARGET\_POWER + PL_c\}\_[dBm], \quad \text{(equation 1)}$$

wherein $P_{CMAX,c}(i)$ is the configured UE transmit power limit for subframe i of serving cell c and $PL_c$ is the downlink path loss estimate calculated in the wireless device 206 for serving cell c, which is estimated based on the strongest reference signal.

In case equation 1 above would preclude the possibility for the ANs who are far from the wireless device 206 to be evolved in the RA procedure, the wireless device 206 may determine the transmission power according to the weakest reference signal, i.e., $PL_c$ is the downlink path loss estimated based on the weakest reference signal, so that the AN set for the RA procedure may be maximized.

This relates to e.g. Action 303 described above.

Based on the output of a performed inter-AN coordination, one AN, e.g. the first AN 208, or more than one AN decide(s) to send the response signal S4 to the wireless device 206. The response signal S4 may be or comprise a Random Access Response (RAR) transmission. This relates to Actions 504 and 505 described above.

Upon reception the response signal S4, the wireless device 206 will know which AN, e.g. the first AN 208, responded to its transmitted single RA preamble S3. Further, the wireless device 206 gets the fictive timing offset TA_fictive, e.g. the fictive timing offset TA_ficitive_AN1 for the first AN 208, comprised in the response S4 transmitted from the first AN 208. Or if both ANs, e.g. both the first and second ANs 208,210, sent responses S4 to the wireless device 206, the corresponding the fictive timing offset TA_ficitive_AN2 from the second AN 210 is obtained as well. This relates to e.g. Actions 305, 503 and 505 described above.

If only the first AN 208 replies to the wireless device 204 with the response signal S4, the wireless device 206 determines a correct timing offset TA_correct_AN1 for the first AN 208 as T_S_AN1−TA_ini_AN1−TA_fictive_AN1 and transmits an uplink signal S5, e.g. a message 3 such as RACH MSG3, to the first AN 208 using the determined correct timing offset. This relates to e.g. Actions 305,306 and 307 described above.

Then, the succeeding procedure would be run between the wireless device 206 and the first AN 208 as usual, e.g., to establish a connection between the wireless device 206 and the communications network 200.

If more than one AN, e.g. both the first AN 208 and the second AN 210, reply with a response signal S4, the wireless device 206 may perform an additional procedure to decide which AN, e.g. the first AN 208 or the second AN 210, to send the uplink single S5 to. The additional procedure performed may for example be a procedure that selects the AN 208,210 that transmitted the signal S1,S2 having the best signal quality of the two as the serving AN. After determination of which AN to transmit the uplink signal S5 to, the wireless device 206 determines the correct timing offset TA_correct to be used for such transmission. If the wireless device 206 is to transmit to the first AN 208, the correct timing offset TA_correct_AN1 to be used is determined as given above. If the wireless device 206 is to transmit to the second AN 210, the correct timing offset TA_correct_AN2 for the second AN 210 is determined as T_S_AN2−TA_ini_AN2−TA_fictive_AN2. After the determination of the correct timing offset TA_correct_AN2, the wireless device 206 transmits the uplink signal S5 to the second AN 210 using the correct timing offset TA_correct_AN2. This relates to e.g. Actions 305,306 and 307 described above.

Then, the succeeding procedure would be run between the wireless device 206 and the second AN 210 as usual, e.g., to establish a connection between the wireless device 206 and the communications network 200.

Some Exemplifying Second Embodiments Relating to UL Probing for UL-Based Mobility In this scenario the wireless device 206 being served by an AN, e.g. by the third AN 212, would like to send an uplink signal S5, e.g. a reference signal, to multiple neighboring ANs, e.g. to the first and second ANs 208,210. The scenario is schematically illustrated in FIG. 9. As previously mentioned, the wireless device 206 receives the first signal from the first AN 208 and the second single S2 from the second AN 210. This relates to e.g. Actions 301 and 501 described above.

The first and second signals S1, S2 may be referred to as DL signals. By means of the first and second signals S1,S2, the wireless device 206 determines the respective DL sync, e.g. the timing T_S_AN1, T_S_AN2 of the respective signals S1,S2.

As previously mentioned, based on the respective DL sync T_S_AN1, T_S_AN2 the wireless device 206 may determine the relative timing interval TI_rel_AN1, TI_rel_AN2 for the single RA preamble transmission for each AN 208,210 by the DL sync and a range X, where X is pre-known by the wireless device 206 via system information or pre-defined by specification.

For the first AN 208, the first relative timing interval TI_rel_AN1 is given by DL sync T_S_AN1 of the first AN 208 and a range X, where X is a maximum value of allowed timing offsets.

For the second AN 210, a second relative timing interval TI_rel_AN2 is given by DL sync T_S_AN2 of the second AN 210 and a range X where X is a maximum value of allowed timing offsets.

With the first relative timing interval TI_rel_AN1 and the second relative timing interval TI_rel_AN2, the overlapping time window may be found to match both ANs as described in more detail above, and being adopted for the single RA preamble transmission. This relates to e.g. Action 302 described above.

By selecting the preamble transmit time T_TX_preamble in the overlapping window, the first initial timing offset TA_ini_AN1 and/or the second initial timing offset TA_ini_AN2 may be determined.

Based on the determined overlapping time window, one single RA preamble S3 is sent out, for which the detailed power control scheme as described above may be applied. This relates to e.g. Actions 302 and 502 described above.

Further, based on an output, e.g. a result, of an inter-AN coordination, the serving AN, e.g. the third AN 212, may forward the response signal S4 from the first AN 208 and the second AN 210 to the wireless device 206 via the active connection the third AN 212 has with the wireless device 206. However, it should be understood that the result of the inter-AN coordination between the three ANs 208,210,212 may be that the first and/or the second AN 208,210 is to transmit their response signal S4 to the wireless device 206. As previously mentioned, the response signal S4 comprises a fictive timing offset for the relevant AN. Thus, a response signal S4 from the first AN 208 comprises a fictive timing offset TA_fictive_AN1 for the first AN 208, and a response signal S4 from the second AN 210 comprises a fictive timing offset TA_fictive_AN2 for the second AN 210. Therefore, and as also previously described, upon reception of the response signal S4, the wireless device 206 will get knowledge about the fictive timing offset for the relevant AN.

Based on the fictive timing offset TA_fictive, the wireless device 206 determines a correct timing offset TA_correct to be used for the uplink signal S5, e.g. the reference signal, to the relevant AN, e.g. to the first and/or the second AN 208,210. This relates to e.g. Actions 305, 306, 307, and 505 described above.

As previously described, the wireless device 206 determines the correct timing offset TA_correct_AN1 for the first AN 208 as TS_AN1−TA_ini_AN1−TA_fictive_AN1 and transmits the uplink signal S5, e.g. the reference signal, to the first AN 208 using the correct timing offset TA_correct_AN1.

As previously described, the wireless device 206 determines the correct timing offset TA_correct_AN2 for the second AN 210 as T_S_AN2−TA_ini_AN2−TA_fictive_AN2 and transmits the uplink signal S5, e.g. the reference signal, to the second AN 210 using the correct timing offset TA_correct_AN2.

Thus, the uplink signal S5, e.g. the reference signal, may be sent from wireless device 206 to the neighboring cells, e.g. to the first and second ANs 208,210, respectively, using the timing info obtained from the previous single RA preamble procedure.

When the word "comprise" or "comprising" is used in this disclosure it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method performed by a wireless device for enabling a single Random Access, RA, preamble to be received by a first Access Node, AN, and by a second AN, which first and second ANs are asynchronous ANs, wherein the wireless device and the first and second ANs are operating in a wireless communications network, and wherein the method comprises:
   receiving a first signal from the first AN and a second signal from the second AN;
   based on the received first and second signals, determining an overlapping time window during which a transmission from the wireless device is receivable by the first and second ANs; and
   initiating transmission of a single RA preamble to the first and second ANs to occur during the determined overlapping time window.

2. The method of claim 1, wherein the determining of the overlapping time window comprises:
   determining the overlapping time window as a time interval where a first relative timing interval TI_rel_AN1 for the first AN and a second relative timing interval TI_rel_AN2 for the second AN are overlapping, wherein the first relative timing interval TI_rel_AN1 is determined by the timing T_S_AN1 of the first signal and a range X, where X is a maximum value of allowed timing offsets, wherein the second relative timing interval TI_rel_AN2 is determined by the timing T_S_AN2 of the second signal and the range X; and selecting a preamble transmit time T_TX_preamble in the overlapping time window.

3. The method of claim 2, wherein X is a value pre-known by the wireless device via system information or a value pre-defined by specification.

4. The method of claim 1, wherein the determining of the overlapping time window further comprises:
determining the overlapping time window to maximize a number of ANs the overlapping time window covers, wherein each covered AN is operating in the wireless communications network, or
determining the overlapping time window to maximize a sum of weights of ANs the overlapping time window covers, wherein each covered AN is operating in the wireless communications network and associated with a weight relating to a signal parameter.

5. The method of claim 1, further comprising:
determining a transmission power for the single RA preamble based on signal strengths of the received first and second signals; and
wherein the transmitting of the single RA preamble further comprises:
transmitting the single RA preamble with the determined transmission power.

6. The method of claim 1, further comprising:
in response to the single RA preamble being transmitted, receiving a response signal from the first AN and/or the second AN, which response signal comprises a first fictive timing offset TA_fictive_AN1 relating to the first AN and/or a second fictive timing offset TA_fictive_AN2 relating to the second AN, and determining a first correct timing offset TA_correct_AN1 for the first AN as the difference between the first fictive timing offset TA_fictive_AN1 and the first initial timing offset TA_ini_AN1, or/and a second correct timing offset TA_correct_AN2 for the second AN as the difference between the second fictive timing offset TA_fictive_AN2 and the second initial timing offset TA_ini_AN2, whereby the correct timing offset TA_correct_AN1 or/and the correct timing offset TA_correct_AN2 are determined for the first or/and second ANs with the single RA preamble.

7. The method of claim 6, further comprising:
transmitting an uplink signal to the first AN and/or the second AN using the respective determined first correct timing offset TA_correct_AN1 and/or determined second correct timing offset TA_correct_AN2.

8. A wireless device for enabling a single Random Access, RA, preamble to be received by a first Access Node, AN, and by a second AN, which first and second ANs are asynchronous ANs, wherein the wireless device and the first and second ANs are operable in a wireless communications network, and wherein the wireless device comprises:
at least one processor circuit; and
at least one memory circuit storing computer code, that when executed, causes the at least one processor circuit to perform operations to:
receive a first signal from the first AN and a second signal from the second AN;
based on the received first and second signals, determine an overlapping time window during which a transmission from the wireless device is receivable by the first and second ANs; and
initiate transmission of a single RA preamble to the first and second ANs during the determined overlapping time window.

9. The wireless device of claim 8, the at least one processor circuit being configured to perform further operations to:
determine the overlapping time window as a time interval where a first relative timing interval TI_rel_AN1 for the first AN and a second relative timing interval TI_rel_AN2 for the second AN are overlapping, wherein the first relative timing interval TI_rel_AN1 is determined by the timing T_S_AN1 of the first signal and a range X, where X is a maximum value of allowed timing offsets, wherein the second relative timing interval TI_rel_AN2 is determined by the timing T_S_AN2 of the second signal and the range X; and
select a preamble transmit time T_TX_preamble in the overlapping time window.

10. The wireless device of claim 9, the at least one processor circuit being configured to perform further operations to receive the X value via system information or to be configured with the X value.

11. The wireless device of claim 8, the at least one processor circuit being configured to perform further operations to:
determine the overlapping time window to maximize a number of ANs the overlapping time window covers, wherein each covered AN is operating in the wireless communications network, or
determine the overlapping time window to maximize a sum of weights of ANs the overlapping time window covers, wherein each covered AN is operating in the wireless communications network and associated with a weight relating to a signal parameter.

12. The wireless device of claim 8, the at least one processor circuit being configured to perform further operations to:
determine a transmission power for the single RA preamble based on signal strengths of the received first and second signals; and
transmit the single RA preamble with the determined transmission power.

13. The wireless device of claim 8, the at least one processor circuit being configured to perform further operations to:
in response to the single RA preamble being transmitted, receive a response signal from the first AN and/or the second AN, which response signal comprises a first fictive timing offset TA_fictive_AN1 relating to the first AN and/or a second fictive timing offset TA_fictive_AN2 relating to the second AN, and determine a first correct timing offset TA_correct_AN1 for the first AN as the difference between the first fictive timing offset TA_fictive_AN1 and the first initial timing offset TA_ini_AN1, or/and a second correct timing offset TA_correct_AN2 for the second AN as the difference between the second fictive timing offset TA_fictive_AN2 and the second initial timing offset TA_ini_AN2, whereby correct timing offsets TA_correct_AN1 or/and TA_correct_AN2 are determined for the first or/and second ANs with the single RA preamble.

14. The wireless device of claim 13, the at least one processor circuit being configured to perform further operations to:
transmit an uplink signal to the first AN and/or the second AN using the respective determined first correct timing offset TA_correct_AN1 and/or determined second correct timing offset TA_correct_AN2.

15. A method performed by a first Access Node, AN, for enabling a single Random Access, RA, preamble from a wireless device to be received by the first AN and by a second AN, which first and second ANs are asynchronous ANs, wherein the wireless device and the first and second ANs are operating in a wireless communications network, and wherein the method comprises:

transmitting a first signal to the wireless device;

initiating reception of a single RA preamble from the wireless device to occur during an overlapping time window during which a transmission from the wireless device is receivable by the first and second ANs;

based on the received single RA preamble, determining a first fictive timing offset TA_fictive_AN1 relating to the first AN;

performing an inter-AN coordination to determine whether the first AN and/or the second AN is to transmit a response signal to the wireless device; and responsive to the first AN being determined to transmit the response signal, transmitting the response signal to the wireless device, the response signal comprising the first fictive timing offset TA_fictive_AN1.

16. A first Access Node, AN, for enabling a single Random Access, RA, preamble transmitted from a wireless device to be received by the first AN and by a second AN, which first and second ANs are asynchronous ANs, wherein the wireless device, and the first and second ANs are operable in a wireless communications network, and wherein the first AN comprises:

at least one processor circuit;

at least one memory circuit storing computer code that when executed by the at least one processor circuit causes the at least one processor circuit to perform operations to:

transmit a first signal to the wireless device;

initiate reception of a single RA preamble from the wireless device during an overlapping time window during which a transmission from the wireless device is receivable by the first and second ANs;

based on the single RA preamble being received, determine a first fictive timing offset TA_fictive_AN1 relating to the first AN, perform an inter-AN coordination to determine whether the first AN and/or the second AN is to transmit a response signal to the wireless device, which response signal comprises the first fictive timing offset TA_fictive_AN1, and responsive to the first AN being determined to transmit the response signal, transmit the response signal to the wireless device, the response signal comprising the first fictive timing offset TA_fictive_AN1.

17. A non-transitory computer readable storage medium storing instructions which, when executed on at least one processor, causes the at least one processor to carry out the method according to claim 1.

\* \* \* \* \*